(12) United States Patent
Hallek

(10) Patent No.: US 10,082,575 B2
(45) Date of Patent: Sep. 25, 2018

(54) METHOD FOR DETERMINING THE SIGNAL-TO-NOISE RATIO OF A TARGET ECHO FROM A RECEIVED SIGNAL RECEIVED FROM AN ULTRASONIC SENSOR OF A MOTOR VEHICLE, DRIVER ASSISTANCE DEVICE AND MOTOR VEHICLE

(71) Applicant: VALEO Schalter und Sensoren GmbH, Bietigheim-Bissingen (DE)

(72) Inventor: Michael Hallek, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 336 days.

(21) Appl. No.: 15/037,095

(22) PCT Filed: Oct. 29, 2014

(86) PCT No.: PCT/EP2014/073181
§ 371 (c)(1),
(2) Date: May 17, 2016

(87) PCT Pub. No.: WO2015/074842
PCT Pub. Date: May 28, 2015

(65) Prior Publication Data
US 2016/0299227 A1    Oct. 13, 2016

(30) Foreign Application Priority Data
Nov. 20, 2013  (DE) ......................... 10 2013 019 431

(51) Int. Cl.
*G01S 15/00*  (2006.01)
*G01S 15/93*  (2006.01)
(Continued)

(52) U.S. Cl.
CPC ........ *G01S 15/931* (2013.01); *G01S 7/52004* (2013.01); *G01S 7/5276* (2013.01);
(Continued)

(58) Field of Classification Search
USPC .......................................................... 367/98
See application file for complete search history.

(56) References Cited

U.S. PATENT DOCUMENTS 4,282,589 A * 8/1981 Evetts .................. G01S 15/102
342/378
2001/0026581 A1* 10/2001 Yamanouchi ........ H04B 1/7077
375/150
(Continued)

FOREIGN PATENT DOCUMENTS

DE         33 32 634 A1    4/1985
DE         37 01 521 A1    8/1988
(Continued)

OTHER PUBLICATIONS

International Search Report issued in PCT/EP2014/073181 dated Feb. 19, 2015 (3 pages).
Written Opinion of the International Searching Authority issued in PCT/EP2014/073181 dated Feb. 19, 2015 (8 pages).
German Search Report issued in Patent application No. 10 2013 019 431.8 dated Mar. 5, 2014 (5 pages).

*Primary Examiner* — James R Hulka
(74) *Attorney, Agent, or Firm* — Osha Liang LLP

(57) ABSTRACT

The invention relates to a method for determining the signal-to-noise ratio (20) of a target echo (11) from a received signal (UE) received from an ultrasonic sensor (3) of a motor vehicle (1), in which: a transmission signal is transmitted in encoded form, the received signal (UE) is decoded and decoding involves the received signal (UE) being correlated with a reference signal and the correlation provides a correlation signal (UK), and the target echo (11) is detected in the correlation signal (UK), wherein the signal-to-noise ratio (20) is determined by determining a
(Continued)

value (21) of the noise in the received signal (UE) on the basis of the correlation signal (UK) and, in so doing, dividing the correlation signal (UK) into a multiplicity of signal segments (17a to 17e) and determining the value (21) of the noise solely on the basis of signal values for that one of the signal segments (17a to 17e) that contains the target echo (11).

9 Claims, 3 Drawing Sheets

(51) Int. Cl.
  *G01S 7/52* (2006.01)
  *G01S 7/527* (2006.01)
  *G01S 15/10* (2006.01)
  *G01S 15/32* (2006.01)
  *G01S 15/87* (2006.01)

(52) U.S. Cl.
  CPC .......... *G01S 15/102* (2013.01); *G01S 15/325* (2013.01); *G01S 15/876* (2013.01); *G01S 2015/932* (2013.01); *G01S 2015/938* (2013.01)

(56) References Cited

U.S. PATENT DOCUMENTS

| | | | |
|---|---|---|---|
| 2003/0112705 A1* | 6/2003 | Nedwell | G01S 15/06 367/100 |
| 2009/0299186 A1* | 12/2009 | Waters | A61B 5/02007 600/449 |
| 2010/0174190 A1* | 7/2010 | Hancock | A61B 5/02007 600/443 |
| 2017/0003391 A1* | 1/2017 | Hallek | G01S 15/931 |

FOREIGN PATENT DOCUMENTS

| | | |
|---|---|---|
| DE | 101 06 142 A1 | 8/2002 |
| DE | 10 2007 039348 A1 | 2/2009 |
| DE | 10 2011 086397 A1 | 5/2012 |
| DE | 10 2011 102 202 A1 | 11/2012 |
| DE | 10 2011 102 574 A1 | 11/2012 |
| DE | 10 2012 017367 A1 | 3/2014 |
| EP | 1 105 749 B1 | 5/2002 |
| EP | 2 144 083 A2 | 1/2010 |
| JP | 2013-170939 A | 9/2013 |
| WO | WO-2009024375 A1 * | 2/2009 ............ G01S 7/527 |

* cited by examiner

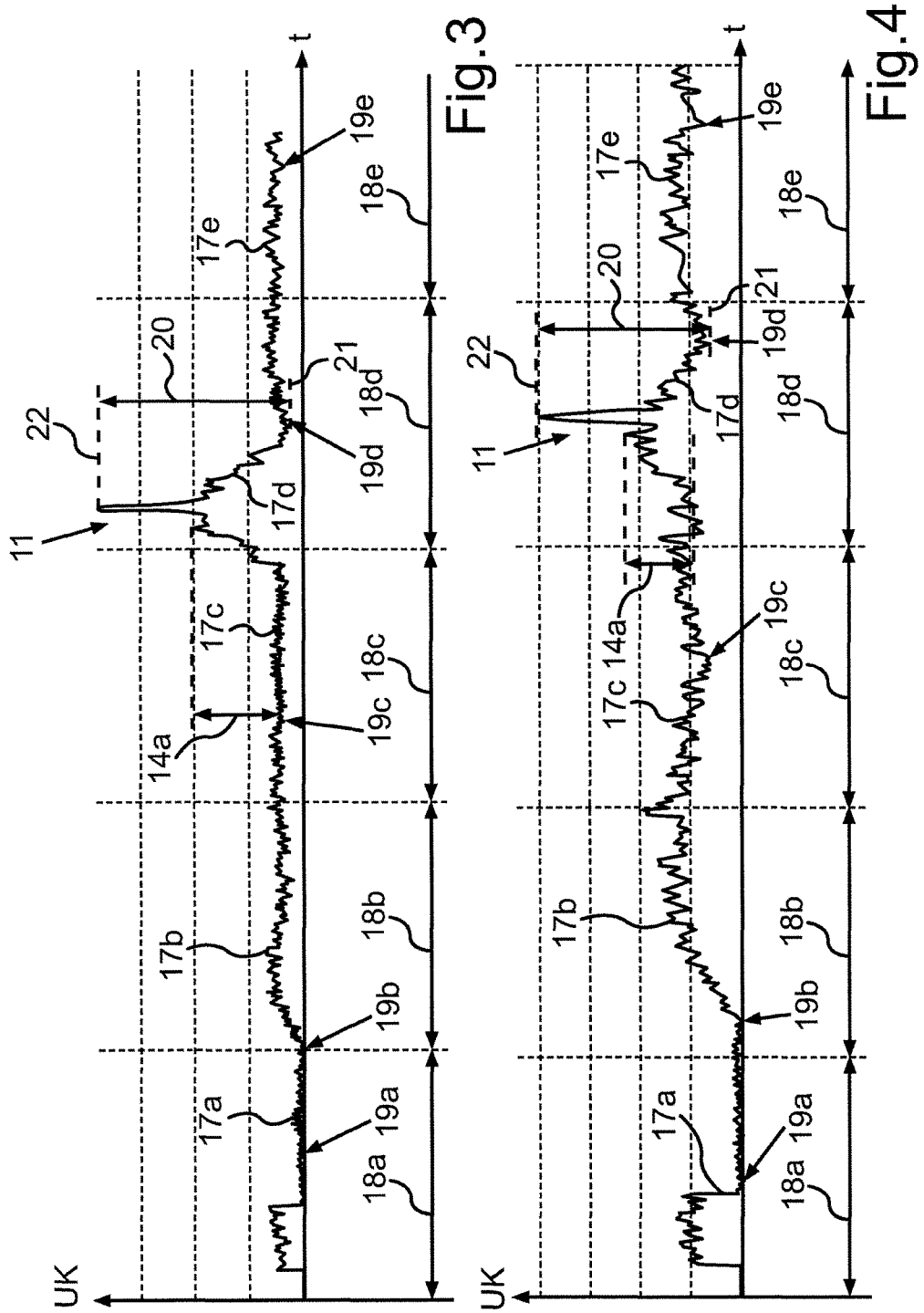

METHOD FOR DETERMINING THE SIGNAL-TO-NOISE RATIO OF A TARGET ECHO FROM A RECEIVED SIGNAL RECEIVED FROM AN ULTRASONIC SENSOR OF A MOTOR VEHICLE, DRIVER ASSISTANCE DEVICE AND MOTOR VEHICLE

The invention relates to a method for determining the actual or real signal-to-noise ratio of a target echo from a received signal that is received from an ultrasonic sensor of a motor vehicle. The method involves a transmission signal—particularly from the same ultrasonic sensor—being transmitted in encoded form, and this involves, by way of example, a predetermined code word being impressed on the transmission signal, for example using modulation. The received signal is decoded, wherein the received signal is decoded by correlating same received signal with a reference signal and this correlation provides a correlation signal. The invention furthermore relates to a driver assistance device that is designed to perform such a method, and to a motor vehicle having a driver assistance device of this type.

Ultrasonic sensors for motor vehicles are already prior art. They are usually used to assist the driver in maneuvering the motor vehicle, namely particularly in parking the motor vehicle in a parking space and removing the motor vehicle from the parking space. In this case, the ultrasonic sensors are part of a driver assistance device that is referred to as a parking assistance system or else as a parking aid. The ultrasonic sensors can be used to measure distances between the motor vehicle and obstacles in its surroundings. The ultrasonic sensors operate on the basis of the echo delay principle: the distance measurement is effected using ultrasonic technology by means of an echo delay method or echo sounding method. In this case, the ultrasonic sensor transmits a transmission signal—ultrasound—and receives a received signal, which is the transmission signal reflected by a vehicle-external object. Thus, ultrasonic waves are transmitted, reflected at an object and received again. The measured delay in the ultrasonic waves is then taken as a basis for determining the distance between the object and the motor vehicle.

It is furthermore prior art to modulate or encode the transmission signal from an ultrasonic sensor, so that a predetermined, specific codeword is impressed on the transmission signal and hence this specific codeword or an identifier is transmitted with the transmission signal. The transmission signal can then be distinguished from other interference signals or from sound signals from other sensors in its own motor vehicle and also from sound signals from other motor vehicles. On the one hand, it is therefore possible to distinguish the received signal from ultrasonic signals from other vehicles; on the other hand, simultaneous operation of multiple ultrasonic sensors of one and the same motor vehicle is therefore also made possible. In this case, each ultrasonic sensor sends a transmission signal having an associated specific identifier and can then recognise its own sound signal or else the signal from an adjacent sensor.

A method for simultaneously operating multiple ultrasonic sensors is known from the document DE 101 06 142 A1, for example. The document EP 1 105 749 B1 also discloses that the transmission signals from different ultrasonic sensors are provided with an identifier of their own and hence can be distinguished from one another. Encoding of a sound signal from an ultrasonic sensor is furthermore known from the document DE 37 01 521 A1.

When the transmission signal is encoded and, in the process, a specific identifier or a code word is impressed on the transmission signal, it is also necessary to check whether the received signal that is received has the same identifier and hence is the transmission signal reflected by an object or can be associated with one and the same ultrasonic sensor. According to the prior art today, the signals received are checked by means of correlation for their encoding. The decoding of the received signal thus has the appearance that this received signal is correlated with a reference signal, the result of the correlation being a measure of the match between the received ultrasonic signal and the expected signal. The reference signal used is usually the transmitted transmission signal or a signal that corresponds to the transmission signal. If a relatively large correlation is identified between the received signal and the reference signal, then it is established that the received signal is the proper signal from the ultrasonic sensor. Only in this case is the received signal processed further and the distance between the motor vehicle and the object computed.

Simple correlation cannot always be used to determine the origin of the received signal or the decoding of the received signal with a high level of accuracy, however. This is because the vehicle-external object frequently moves relative to the motor vehicle and the relative speed between the motor vehicle and the object causes a frequency shift in the ultrasonic signal on account of the Doppler effect. Therefore, the prior art frequently also uses a reference signal for the correlation that does not precisely correspond to the transmitted transmission signal but rather corresponds to a frequency-shifted transmission signal. Hence, an attempt is made to compensate for the Doppler shift in the received signal.

The disadvantage of correlation in this case is that the correlation result or the correlation signal contains a relatively high level of inherent noise—what is known as correlation noise—that significantly decreases the signal-to-noise ratio. The determination of the signal-to-noise ratio of the correlation signal itself thus does not correspond to the real and actual signal-to-noise ratio of the received signal. However, the determination of the signal-to-noise ratio is important because this signal-to-noise ratio can be taken as a basis for establishing whether the target echo is an interference echo or else comes from the proper ultrasonic sensor. Without precise ascertainment of the signal-to-noise ratio, the correlation result therefore cannot be evaluated precisely.

The computation of the correlation of a received signal received from an ultrasonic sensor with a known pattern is furthermore known from the document DE 10 2011 086 397 A1. A correlation output is used here as the basis for forming a security reference level, the security reference level being a threshold value curve with which the correlation output is compared in order to detect a peak in the received signal. This peak indicates that a present signal state of the received signal contains the known pattern.

A method for producing a threshold value curve for evaluating an echo signal for an ultrasonic sensor is known from the document DE 10 2011 102 574 A1, for example.

It is an object of the invention to demonstrate a solution to how a method of the type in question cited at the outset can involve precise ascertainment of the actual signal-to-noise ratio of the target echo.

The invention achieves this object by means of a method, by means of a driver assistance device and by means of a motor vehicle having the features according to the respective independent patent claims. Advantageous embodiments of the invention are the subject matter of the dependent patent claims, the description and the figures.

A method according to invention is used to determine the signal-to-noise ratio of a target echo received by an ultrasonic sensor of a motor vehicle. A transmission signal is transmitted in encoded form, and a received signal received by the ultrasonic sensor is decoded. Decoding involves the received signal being correlated with a known reference signal—for example the transmission signal or a frequency-shifted transmission signal—and this correlation provides a correlation signal. The target echo is detected in the correlation signal. The signal-to-noise ratio is determined by determining a value of the noise in the received signal on the basis of the correlation signal, wherein the correlation signal is divided into a multiplicity of signal segments and the value of the noise is determined solely on the basis of signal values for the one of the signal segments that contains the target echo.

Consequently, the actual or real value of the noise in the received signal is determined, and the signal-to-noise ratio is computed from this value of the noise. In this case, the value of the noise is ascertained on the basis of the correlation signal itself, which contains a relatively high level of inherent noise or correlation noise. Determining the actual value of the noise in the received signal on the basis of the correlation signal allows the signal-to-noise ratio to be determined without the influence of the correlation noise itself. Hence, more or less the correlation noise itself is determined and can therefore be ignored when determining the real signal-to-noise ratio of the target echo. As a result, a signal-to-noise ratio that corresponds to the real or actual signal-to-noise ratio is consequently obtained without said real or actual signal-to-noise ratio being influenced by the inherent noise of the correlator. Determining the noise in the received signal on the basis of the correlation signal has the advantage that determining the signal-to-noise ratio requires only the correlation signal and not additionally the original received signal (upstream of the correlator) to be processed. Accuracy for determination of the signal-to-noise ratio is additionally improved by virtue of the value of the noise that is used to determine the signal-to-noise ratio being ascertained solely on the basis of values of a signal segment of the correlation signal, specifically of that signal segment in which the target echo is detected. Hence, it is not the entire correlation signal that is used to determine the actual noise but rather just a signal section around the target echo. This improves the accuracy of determination of the actual value of the noise, since only local noise and hence noise that has a temporal relevance is taken into consideration.

Thus, the correlation signal is divided into a multiplicity of signal segments. These signal segments are preferably successive and preferably adjoining signal sections. In other words, the correlation signal is therefore divided in the time domain into multiple successive and particularly adjoining time intervals, the value of the noise being determined, in order to ascertain the signal-to-noise ratio, by using only that signal section that lies in that time interval in which the target echo is also detected.

The value determined for the noise is preferably a local minimum for the correlation signal in that signal segment that contains the target echo. In this manner, it is possible for the actual background noise in the received signal to be detected precisely. The reason is that the local minimum is a measure of the actual, real noise without influence from a correlation noise.

Preferably, the signal-to-noise ratio is determined as a difference and/or a ratio between a maximum for the target echo in the correlation signal, on the one hand, and the ascertained value of the noise, on the other hand. As a result, a signal-to-noise ratio is therefore available that can be taken as a basis for reliably and precisely establishing whether the target echo is an interference signal or else the proper signal from the ultrasonic sensor. In order to ascertain this, the ascertained signal-to-noise ratio can be compared with a reference value, for example.

Preferably, a length of the signal segments is stipulated on the basis of a code length of a code word that is used to encode the transmission signal. The length of the signal segments is therefore preferably dependent on the length of the transmission signal and can therefore be adjusted according to respective need during operation of the ultrasonic sensor. All the signal segments preferably have the same length in this case. The relationship that the greater the code length of the code word, the greater too the length of a signal segment preferably applies. The length of the signal segments can therefore be matched to the length of the transmission signal on the basis of the situation.

It is found to be advantageous if the signal-to-noise ratio and/or value of the noise is subjected to plausibilization: the multiplicity of signal segments can have a respective local minimum for the respective signal segment determined for it, and the signal-to-noise ratio and/or the value of the noise can be plausibilized on the basis of the local minima. In particular, a mean value is computed from all the local minima this case and used to plausibilize the signal-to-noise ratio and/or the value of the noise. By way of example, it is possible to check whether the value of the noise lies within a tolerance value range around the mean value of the local minima and/or the signal-to-noise ratio lies within a tolerance value range around a reference ratio, which is computed on the basis of the mean value of the local minima. If a discrepancy from the tolerance value range is detected, then the current measurement can be discarded, for example, or the signal-to-noise ratio can be determined in another manner. It is therefore possible to prevent errors in the determination of the signal-to-noise ratio and hence in the detection of target objects.

Provision may optionally be made for the value of the noise to be determined by filtering the correlation signal by means of a low pass filter and, in so doing, providing a filter signal. It is then possible to determine the value of the noise on the basis of the filter signal. Such a low pass filter can therefore be used to effectively provide an envelope or an envelope curve for the correlation signal, on the basis of which the actual value of the real noise can then be ascertained. The provision of such a filter signal allows the value of the noise to be determined without a large amount of computation complexity and precisely, since what are known as outliers can be eliminated.

The signal-to-noise ratio can be taken as a basis for determining whether the target echo is the transmission signal reflected by a vehicle-external object and hence comes from an actual object or else is an interference signal, for example ultrasound from an external interference source.

The invention furthermore relates to a driver assistance device for a motor vehicle, having at least one ultrasonic sensor and having a control device that is designed to perform a method according to the invention.

A vehicle according to the invention comprises a driver assistance device according to the invention.

The preferred embodiments presented with reference to the method according to the invention, and the advantages of said embodiments, apply accordingly to the driver assistance device according to the invention and to the motor vehicle according to the invention.

Further features of the invention will become apparent from the claims, the figures and the description of the figures. All the features and combinations of features cited in the description above and the features and combinations of features cited in the description of the figures below and/or shown in the figures alone can be used not just in the respectively indicated combination but also in other combinations or else on their own.

The invention will now be explained in more detail on the basis of individual preferred exemplary embodiments and with reference to the appended drawings, in which:

FIGS. 3 and 4 show exemplary profiles for correlation signals, wherein a method according to one embodiment of the invention is explained in more detail.

Figure 1:
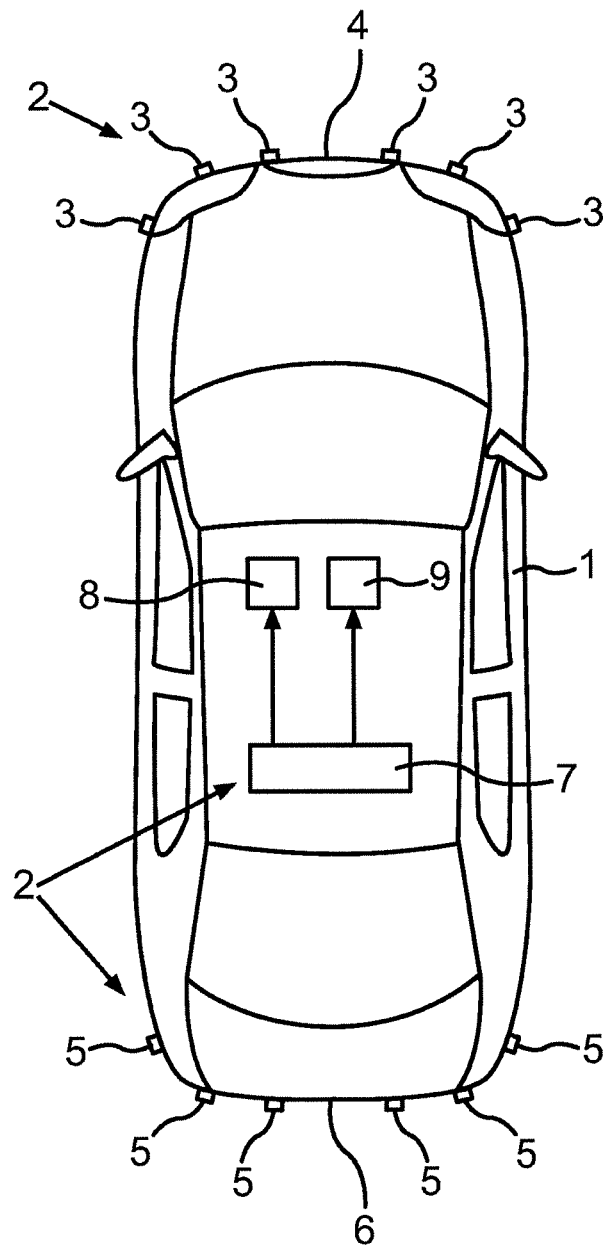
FIG. 1 shows a schematic illustration of a motor vehicle having a driver assistance device according to an embodiment of the invention.

A motor vehicle 1, shown in FIG. 1, is a car, for example. The motor vehicle 1 contains a driver assistance device 2, which is a parking aid or parking assistance system. The driver assistance device 2 is used to assist the driver of the motor vehicle 1 in parking in a parking space and in removing the vehicle from the parking space. For this purpose, the driver assistance device 2 comprises a multiplicity of ultrasonic sensors 3, which are in a distributed arrangement on a front bumper 4 of the motor vehicle 1, and a multiplicity of ultrasonic sensors 5, which are in a distributed arrangement on a rear bumper 6. All the ultrasonic sensors 3, 5 are electrically coupled to a control device 7 of the driver assistance device 2. The control device 7 can contain a digital signal processor or a microcontroller and is used to actuate the ultrasonic sensors 3, 5. The control device 7 also receives all the received signals from the ultrasonic sensors 3, 5 and takes these signals as a basis for determining the distances between the motor vehicle 1 and obstacles located in its surroundings. On the basis of these distances, the control device 7 can actuate a loudspeaker 8 and/or a visual display device 9—for example a display— for example. The loudspeaker 8 and/or the display device 9 is/are used to inform the driver about the measured distances.

If need be, the driver assistance device 2 may also be an automatic or semi-automatic parking assistance system that is used to automatically detect a parking space and to automatically compute a suitable parking path along which the motor vehicle 1 can then be automatically or semi-autonomously guided into the parking space. In the case of fully automatic parking assistance systems, the driver assistance device 2 undertakes both longitudinal guidance and transverse guidance of the motor vehicle 1, whereas in the case of semiautomatic systems, the driver assistance device 2 undertakes only transverse guidance and hence steering automatically, while the driver himself needs to accelerate and brake. Systems are also known in which the driver has to undertake both longitudinal guidance and transverse guidance himself but advice regarding steering is output by the driver assistance device 2.

The control device 7 can actuate the ultrasonic sensors 3, 5 such that the ultrasonic sensors 3, 5 each transmit a transmission signal (ultrasound) with an impressed, specific or predetermined code word. To this end, the transmission signals are modulated, for example frequency-modulated and/or amplitude-modulated. A method based on one embodiment is explained in more detail below. Even though the description below relates to a single ultrasonic sensor 3, 5, it is also possible for all other ultrasonic sensors 3, 5 to be operated in the same manner.

The ultrasonic sensor 3, 5 transmits a transmission signal that has been modulated in a specific manner and hence has a specific code word as an identifier. This transmission signal is then reflected by an obstacle and returns to the ultrasonic sensor 3, 5 as a received signal before the next transmission signal is actually transmitted. The ultrasonic sensor 3, 5 receives this received signal. In order to decode the received signal and to be able to check whether or not the received signal comes from the ultrasonic sensor 3, 5 in question, the received signal is correlated with a reference signal—particularly the frequency-shifted transmission signal—and this correlation provides a correlation signal.

Figure 2:
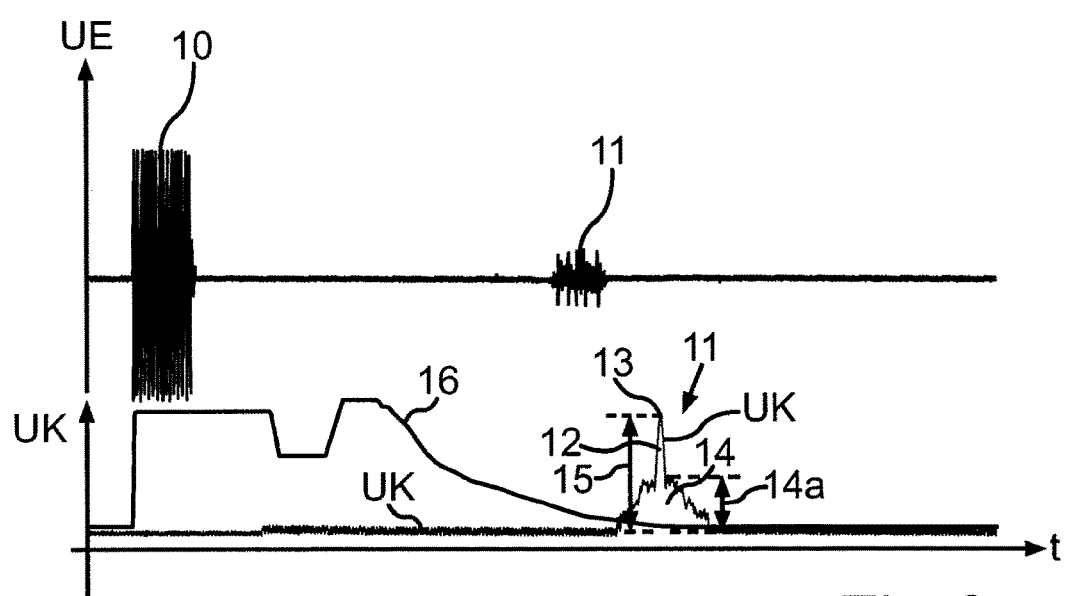
FIG. 2 shows time profiles for a received signal and a correlation signal from an ultrasonic sensor.

An exemplary received signal UE or the function thereof over time t is shown in FIG. 2 (at the top). In this case, a first echo 10 corresponds to the oscillation of the diaphragm of the ultrasonic sensor 3, 5 when the transmission signal is transmitted, and is therefore not a genuine target echo from the received signal UE. The echo 10 is thus used overall to initiate the measurement process, which lasts for a predetermined period. Within this period or this predetermined interval of time, the ultrasonic sensors 3, 5 can receive target echoes. Such a target echo is denoted by 11 in FIG. 2.

If the received signal UE is correlated with the reference signal, then this produces a correlation signal UK, as shown at the bottom of FIG. 2. This correlation signal UK also contains the target echo 11, which now has the shape of a signal peak 12 with a maximum 13. The signal-to-noise ratio of this target echo 11 now needs to be ascertained. This ascertainment is negatively influenced by correlation noise or inherent noise 14 in the correlator, however, because this correlation noise 14 is overlaid on the total noise 14a. If the signal-to-noise ratio were now to be determined as the difference between the level 15 or the maximum 13, on the one hand, and the total noise 14a, on the other hand, then the result of this determination would be imprecise because the correlation noise 14 is not contained in the actual received signal UE.

FIG. 2 additionally shows a threshold value curve 16. The significance of this threshold value curve 16 is that the amplitude of the received target echoes 11 from the correlation signal UK is compared therewith and the target echo 11 is processed further as a possible echo from an object only if its level is higher than the threshold value curve 16. The threshold value curve 16 is thus used to detect the target echoes 11.

In order to determine the actual value of the real noise in the received signal UE and hence the actual signal-to-noise ratio, a method is proposed that is explained in more detail below with reference to FIGS. 3 and 4:

In this context, FIG. 3 shows a time profile for a correlation signal UK without external noise, while FIG. 4 shows an exemplary time profile for a correlation signal UK that is influenced by external noise. To ascertain the actual noise, the correlation signal UK is divided into a plurality of signal segments 17a to 17e that represent successive and directly adjacent signal sections of the correlation signal UK. In other words, the prescribed measurement time interval in which the received signal UE is received is divided into a plurality of time intervals 18a to 18e. In each time interval 18a to 18e, a respective local minimum 19a to 19e for the respective signal segments 17a to 17e is detected in real time or when the correlation signal UK is provided. A check is then performed to determine in which of the time intervals 18a to 18e a target echo 11 is detected. In the exemplary embodiment shown in FIGS. 3 and 4, a target echo 11 is detected within the time interval 18d. A signal-to-noise ratio 20 for this target echo 11 is determined by using a value 21 for the noise that corresponds to the local minimum 19d of the signal segment 17d within the time interval 18d. In addition, a maximum 22 for the target echo 11 is determined. The signal-to-noise ratio 20 determined is then a difference or a ratio between the maximum 22, on the one hand, and the local minimum 21, on the other hand.

In order to ascertain which time interval 18a to 18e contains the detected target echo 11 or to which signal segment 17a to 17e this target echo 11 belongs, the maximum value, that is to say the maximum 22, of the target echo 11 can be detected. The target echo 11 therefore belongs to that signal segment 17a to 17e that also contains the maximum 22.

As is evident from FIG. 3, the signal-to-noise ratio 20 is determined by using the actual noise in the signal, rather than the correlation noise 14a, which is distinctly above the actual noise. This correlation noise 14a can be clearly seen in FIG. 4 too.

The length of the signal segments 17a to 17e or of the time intervals 18a to 18e is preferably set during operation of the motor vehicle 1. In this case, it is set on the basis of the temporal length of the transmission signal and hence on the basis of the length of the code word that is used to encode the transmission signal. The length of the time intervals 18a to 18e can thus vary during operation of the motor vehicle 1. All the time intervals 18a to 18e are preferably of the same length in this case. In particular, the number of time intervals 18a to 18e or of signal signals 17a to 17e is also kept constant.

Optionally, provision may also be made for the correlation signal UK to be filtered by means of a low pass filter before the signal-to-noise ratio is determined. The value 21 of the noise can thus be detected in the filtered signal.

Optionally, provision may also be made for a mean value that indicates the average noise in the received signal UE to be computed from all the local minima 19a to 19e. This mean value can then be used to perform plausibilization for the value 21 of the noise and/or for the signal-to-noise ratio 20. By way of example, this can involve checking whether the ascertained value 21 of the noise lies in a tolerance value range around the mean value. If the value 21 lies outside this tolerance value range, this measurement can be discarded, for example, or the actual signal-to-noise ratio 20 can be determined on the basis of the mean value. Additionally or alternatively, it is also possible to compute a reference ratio from the mean value as the ratio between the maximum 22 and the mean value. The ascertained signal-to-noise ratio 20 can then be compared with this reference ratio, and it is possible to check whether the ascertained signal-to-noise ratio 20 lies within a tolerance value range around the reference ratio. If a discrepancy is detected in this context, the measurement can be discarded or the reference ratio can be used as the actual signal-to-noise ratio.

The invention claimed is:

1. A method for determining a signal-to-noise ratio of a target echo from a received signal (UE) received from an ultrasonic sensor of a motor vehicle, the method comprising:

transmitting a transmission signal in encoded form;
decoding the received signal (UE) by correlating the received signal (UE) with a reference signal to obtain a correlation signal (UK); and
detecting the target echo in the correlation signal (UK), wherein
the signal-to-noise ratio is determined by determining a value of the noise in the received signal (UE) on the basis of the correlation signal (UK) and, in so doing, dividing the correlation signal (UK) into a multiplicity of signal segments and determining the value of the noise solely on the basis of signal values for one of the signal segments that contains the target echo.

2. The method according to claim 1, wherein the value determined for the noise is a local minimum for the one signal segment that contains the target echo.

3. The method according to claim 1, wherein the signal-to-noise ratio is determined as the difference and/or ratio between a maximum for the target echo in the correlation signal (UK) and the value of the noise.

4. The method according to claim 1, wherein a length of the signal segments is stipulated on the basis of a code length of a code word that is used to encode the transmission signal.

5. The method according to claim 1, wherein the multiplicity of signal segments has a respective local minimum for the respective signal segment determined for it, and the signal-to-noise ratio and/or the value of the noise is plausibilized on the basis of a mean value for the local minima.

6. The method according to claim 1, wherein the value of the noise is determined by filtering the correlation signal (UK) using a low pass filter and, in so doing, providing a filter signal, wherein the value of the noise in the received signal (UE) is determined on the basis of the filter signal.

7. The method according to claim 1, wherein the signal-to-noise ratio is taken as a basis for determining whether the target echo is a signal component of the transmission signal reflected by a vehicle-external object or is an interference signal.

8. A driver assistance device for a motor vehicle, comprising:
at least one ultrasonic sensor; and
a control device configured to:
actuate the ultrasonic sensor to transmit an encoded transmission signal,
decode a received signal (UE) received from the ultrasonic sensor by correlating this received signal (UE) with a reference signal, and, in so doing, to provide a correlation signal (UK),
determine the signal-to-noise ratio of a target echo detected in the correlation signal (UK), and
determine the signal-to-noise ratio by determining a value of the noise in the received signal (UE) on the basis of the correlation signal (UK) and, in so doing, dividing the correlation signal (UK) into a multiplicity of signal segments and determining the value of the noise solely on the basis of signal values for that one of the signal segments that contains the target echo.

9. A motor vehicle having a driver assistance device according to claim 8.

* * * * *